United States Patent [19]
Kazuyuki

[11] Patent Number: 5,774,166
[45] Date of Patent: Jun. 30, 1998

[54] IMAGE FORMING APPARATUS

[75] Inventor: Ohnishi Kazuyuki, Yamatokoriyama, Japan

[73] Assignee: Sharp Kabushiki Kaisha, Osaka, Japan

[21] Appl. No.: 664,140

[22] Filed: Jun. 14, 1996

[30] Foreign Application Priority Data

Jun. 23, 1995 [JP] Japan ................................. 7-157950

[51] Int. Cl.⁶ ........................................................ B41J 2/47
[52] U.S. Cl. ................................................................ 347/248
[58] Field of Search ...................................... 347/247, 248, 347/234, 237; 358/296, 300, 302

[56] References Cited

U.S. PATENT DOCUMENTS

| | | | |
|---|---|---|---|
| 4,695,805 | 9/1987 | Massingill et al. | 327/156 |
| 5,502,578 | 3/1996 | Smitt | 358/483 |

FOREIGN PATENT DOCUMENTS

| | | |
|---|---|---|
| 51-046 141-A | 4/1976 | Japan . |
| 58-032 543 | 7/1983 | Japan . |
| 63-018 766-A | 1/1988 | Japan . |
| 63-296 559-A | 12/1988 | Japan . |
| 2-030 275-A | 1/1990 | Japan . |
| 4-029191-A | 1/1992 | Japan . |

*Primary Examiner*—Mark J. Reinhart
*Attorney, Agent, or Firm*—David G. Conlin; Eric P. Raciti

[57] ABSTRACT

An oscillator generates a rectangular wave, based on which sawtooth waves are produced. When a synchronizing signal which is created when a laser beam from a laser diode is incident on a photosensor, is detected, a voltage of one of the sawtooth waves is sampled to hold it as a sample-hold signal. Comparators compare the sample-hold signal with the sawtooth waves, and a flip flop alternately outputs one of the compared results, to produce a pixel clock which regularly keeps a constant time relation to the synchronizing signal.

4 Claims, 16 Drawing Sheets

IMAGE FORMING APPARATUS

BACKGROUND OF THE INVENTION

(1) Field of the Invention

The present invention relates to an image forming apparatus such as copiers, printers, facsimiles and the like, in particular relating to an image forming apparatus using laser scanning.

(2) Description of the Prior Art

In an optical write unit which uses laser scanning (to be referred as a laser unit hereinbelow) such as digital copiers and laser beam printers, main-scan operation is effected by radiating a laser beam on a rotational mirror. In order to detect where, in the main scan, the laser beam is irradiated, a sensor for optical direction is provided in the laser unit. This sensor generates a synchronizing signal as soon as the laser beam impinges on the sensor. With reference to the synchronizing signal, the apparatus starts scanning each line, making sure image jitter, which would be generated in the auxiliary scan direction, is limited to an allowable degree.

The time when the synchronizing signal is generated will vary for every line due to the unevenness of the motor which drives the rotational mirror. Jitter is prevented by the following methods:

1) A clock of one-pixel cycle is produced by generating a clock signal which has the frequency about four times greater than that of the clock signal for one-pixel cycle, and dividing the generated signal in a counter. When the synchronizing signal arises, the counter is reset, thus jitter can be regulated within one-fourth of the pixel length relative to the right position specified by the synchronizing signal (This method is used in a typical laser printer etc.).

2) Based on a clock signal of one-pixel cycle, many clock signals are prepared which have different delay times from one another. A circuit which selects one of the multiple number of clock signals is provided to select an optimum one in accordance with the timing of the synchronizing signal.

Japanese Patent Publication Hei 5 No. 80,191 cited the above method 1) (Japanese Patent Application Laid-Open Sho 51 No.46,141 and Japanese Patent Publication Sho 58 No. 32,543) as its prior art. The disclosure pointed out that these prior art methods would increase the cost as the frequency of the reference clock becomes high, and proposed a method whereby the frequency of the reference clock is halved by using two reference clocks having a phase difference of 180° from each other. That is, the method disclosed in the Japanese Patent Publication Hei 5 No. 80,191 can be said as to be a modified technology of the method 1).

Japanese Patent Application Laid-Open Sho 63 No. 296, 559 cited the above method 2) as its prior art and pointed out a problem that in a system where a plurality of optical scanning devices are used in a color printer etc., the times when all the optical scanning devices for different colors are started scanning will be adjusted within a clock of one-pixel so that the produced images for the different colors will register in a final image. To solve the problem, the disclosure proposed a circuit which separately controls every circuit for each optical scanning device for selecting a clock signal from a multiple number of different clock signals which are different in phase, in accordance with the timing of the synchronizing signal generated. The document, Japanese Patent Application Laid-Open Sho 63 No. 296,559, corresponds to an improved technology of the above method 2).

Since in the conventional method 1) (for laser printers), the amount of jitter is determined by the frequency of oscillation, the frequency of oscillation should at least be about four time greater than the clock signal to be produced. However, as the scanning speed becomes greater, the frequency of oscillation increases too high so that it becomes difficult to realize the circuit for oscillation. Further, the augment of the oscillating frequency not only increases the radiation of wave noises as well as affects other circuits, but also requires high-speed operation devices resulting in increased cost.

The above conventional method 2) needs to produce many clock signals which have different delay times from one another. As the delay times should be stable with respect to the variations of temperature and voltage, the circuit which produces stable delay times requires high-level technologies. Further, in order to minimize jitter, it is necessary to prepare as many clock signals as possible by delaying the signals by a minute step from one another. Therefore, this method requires an increased number of delay elements constituting the circuit of controlling the delay amount.

SUMMARY OF THE INVENTION

The present invention has been devised in view of what has been discussed above and it is therefore an object of the present invention to provide an image forming apparatus which only uses an analog periodic signal without needing a high-frequency reference clock signal, or without needing a large number of clock signals whose phases are differentiated from one another, to produce a pixel clock signal which is highly precisely synchronized with the synchronizing signal.

In accordance with a first aspect of the invention, an image forming apparatus includes: a synchronizing signal generating means for generating a synchronizing signal which instructs the time when image forming for each line in the main scan direction is to be started; an oscillating means for generating an analog periodic signal whose voltage value periodically varies; sample-hold means for sampling and holding the voltage value of the analog periodic signal from the oscillating means in response with the input of the synchronizing signal; comparing means for comparing the voltage value which has been sampled and held in the sample-hold means with the analog periodic signal; and a pixel clock generating means for generating a pixel clock signal as to be a reference signal for image forming, in accordance with the output from the comparing means.

In accordance with a second aspect of the invention, in an image forming apparatus defined in the first configuration, a pair of analog periodic signals which have the same cyclic period and a phase difference of 180° from one another are used; from the two analog periodic signals, one whose voltage value is varying gradually when a synchronizing signal is generated, is selected as the analog periodic signal to be used for sample-holding; and the sample-hold value is compared with the selected analog periodic signal.

In accordance with a third aspect of the invention, in an image forming apparatus defined in the first configuration, the analog signal is a chopping wave; in either case where the time when the synchronizing signal is generated corresponds to the rising slope of the chopping wave or where the time when the synchronizing signal is generated corresponds to the falling slope of the chopping wave, the voltage of the chopping wave is sampled and held at the timing of the generation of the synchronizing signal and the output from the comparing means is inverted at the timing of the generation of the synchronizing signal.

In the above first configuration, since the voltage value of the analog periodic signal is sampled and held in accordance with the time when the synchronizing signal is generated, the generating timing of the synchronizing signal relative to the clock signal based on which the oscillating means operates is retained as a voltage value. The voltage value thus retained is compared with the analog periodic signal which varies periodically, whereby a pixel clock, whose phase is continuously shifted in accordance with the generating timing of the synchronizing signal, is generated.

In the above second configuration, even if one of the analog periodic signals is in the phase where the voltage value sharply varies when. the synchronizing signal is generated, the other analog periodic signal which has a phase difference of 180° from the first analog signal will stay in a portion where the voltage value varies slowly. Since the sample-hold operation of the voltage value is performed from that portion, a stable sample-hold operation at the timing of the generation of the synchronizing signal can be done.

Since the above third configuration uses a chopping wave as the analog periodic signal, this makes it possible to realize stabilized sample hold operations near the turning points of the analog periodic signal.

DESCRIPTION OF THE PREFERRED EMBODIMENTS

With reference to the drawings, an embodiment of an image forming apparatus of the invention will be explained in detail hereinbelow by describing a digital copier to which the present invention is applied.

Figure 1:
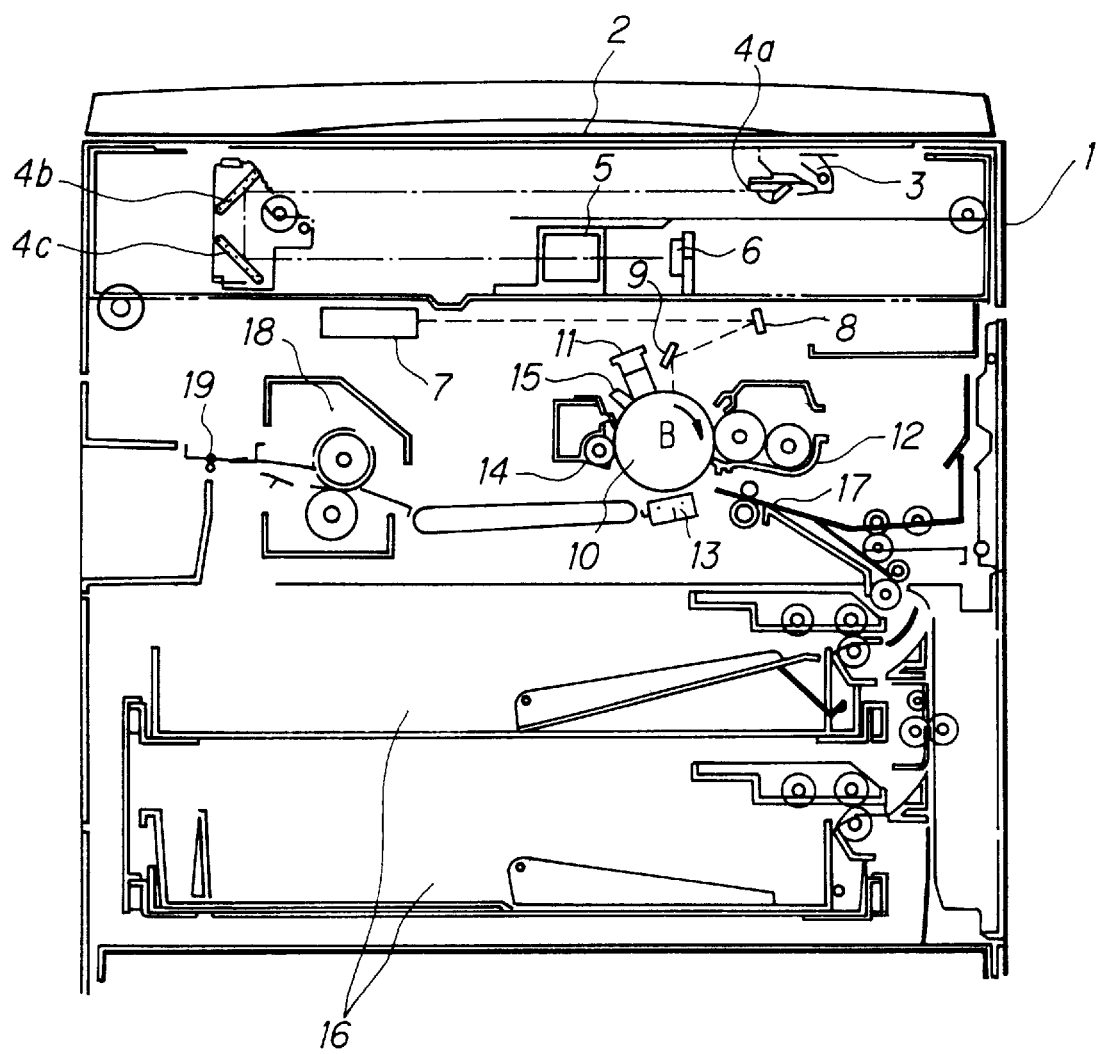
FIG. 1 is a sectional view showing an overall configuration of digital copier as an example of an image forming apparatus in accordance with an embodiment of the invention.

FIG. 1 is a sectional view showing an overall configuration of a digital copier. The copier designated at 1 has an original table 2 of a hard transparent glass on the top. An original (not shown) placed on the original table 2 is illuminated by a lamp unit 3 and the reflected light on the original is conducted through mirrors 4a, 4b, 4c and a lens unit 5 onto a light receiving surface of a CCD sensor 6 where the optical information is converted into electric information. The image data thus picked up by the CCD sensor 6 is processed an unillustrated image processing section and then sent to a laser unit 7 from where the laser beam modulated by the image data is emitted. The emitted laser beam is conducted through mirrors 8, 9 to a photoreceptive drum 10 (rotatable in the direction of arrow B) on which an electrostatic latent image is formed.

Provided around the photoreceptive drum 10 is a main charger 11 which uniformly electrifies the surface of the photoreceptive drum 10 prior to exposure. The aforementioned laser beam is exposed to the charged surface to produce a static latent image. On the downstream side of the main charger 11, a developing hopper 12 which stores toner and developer, a transfer/separation charger 13, a cleaning unit 14 and an erasing lamp 15 are arranged in that order. Provided on the left side of the transfer/separation charger 13 is a fixing unit 18 where paper with toner image transferred is heated and pressed so that toner will be fixed on the paper.

Detailed procedures for copying operation are made as follows:

The surface of the photoreceptive drum 10 is uniformly charged by the main charger 11 while an original is scanned and the image data picked up by the CCD sensor 6 is processed through an illustrated image processor. The processed data is used to modulate the laser beam emitted from the laser unit 7 and the modulated laser beam is irradiated onto the surface of the photoreceptive drum 10, whereby a static latent image is formed in the exposure area. Subsequently, the static latent image in the image area is supplied with toner from the developing hopper 12 to produce a toner image. The toner image is transferred to a copy paper 17 delivered from a paper cassette 16 at the position of the transfer/separation charger 13. Upon the transfer operation, part of toner which could not be transferred is left behind on the surface of the photoreceptive drum 10. The residual toner is scraped by the cleaning unit 14. Next, the erasing lamp 15 erases residual electric charges on the surface of the photoreceptive drum 10. The copy paper 17 with the toner image transferred thereon is passed through the fixing unit 18 in which the toner image is fixed with heat and pressure to the copy paper 17. The thus fixed paper 17 is discharged outside by a discharge roller 19.

Figure 2:
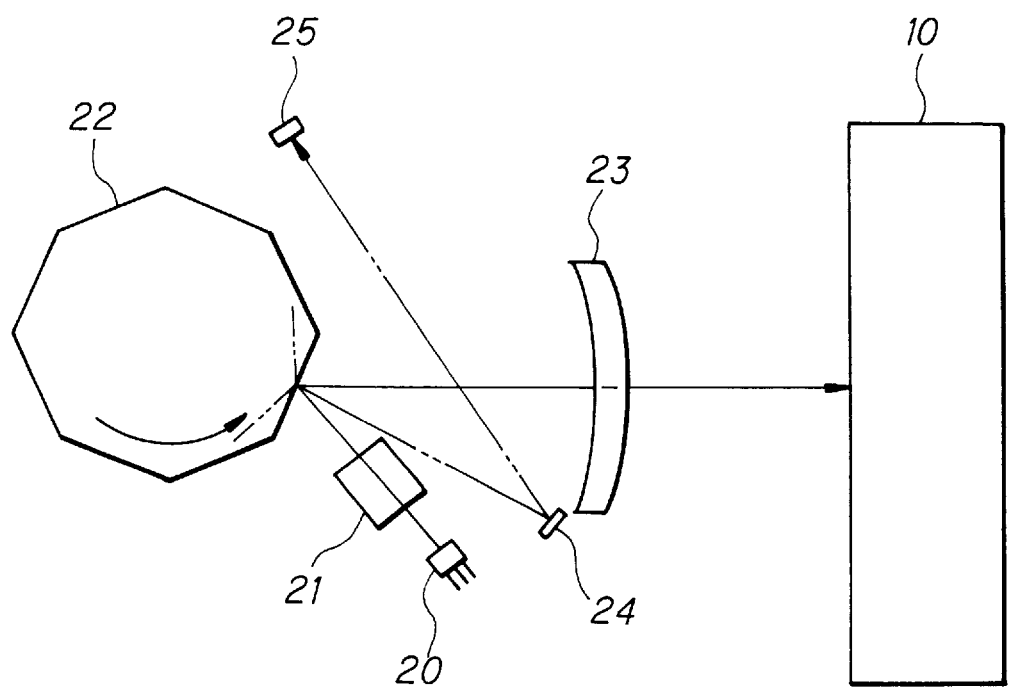
FIG. 2 is a front view showing a configuration of a laser unit in FIG. 1.

FIG. 2 shows an arrangement of the laser unit 7. A laser diode 20 is turned on and off based on the image data supplied from the image processor (not shown). That is, based on the magnitude of the image data value the turn-on time of the diode is controlled. This control enables reproduction of a halftone image by digital halftone. The light beam emitted from the laser diode 20 passes through a lens 21 to be made incident on a polygon mirror 22 which has eight facets and is being rotated at a uniform rate with a motor (not shown). The laser beam reflected by the rotating polygon mirror 22 is focused on the surface of the photoreceptive drum 10 through a correcting lens 23 etc., so that the focused laser spot will scan the photoreceptive drum 10 surface in the main scan direction.

Provided on the start side of scanning the laser beam is a mirror 24 which reflects the laser beam toward a photo sensor 25 just before the start of scanning each line. The output from the photosensor 25 is supplied as a synchronizing signal to a laser unit controlling circuit shown in FIG. 3.

(FIRST EMBODIMENT)

Figure 3:
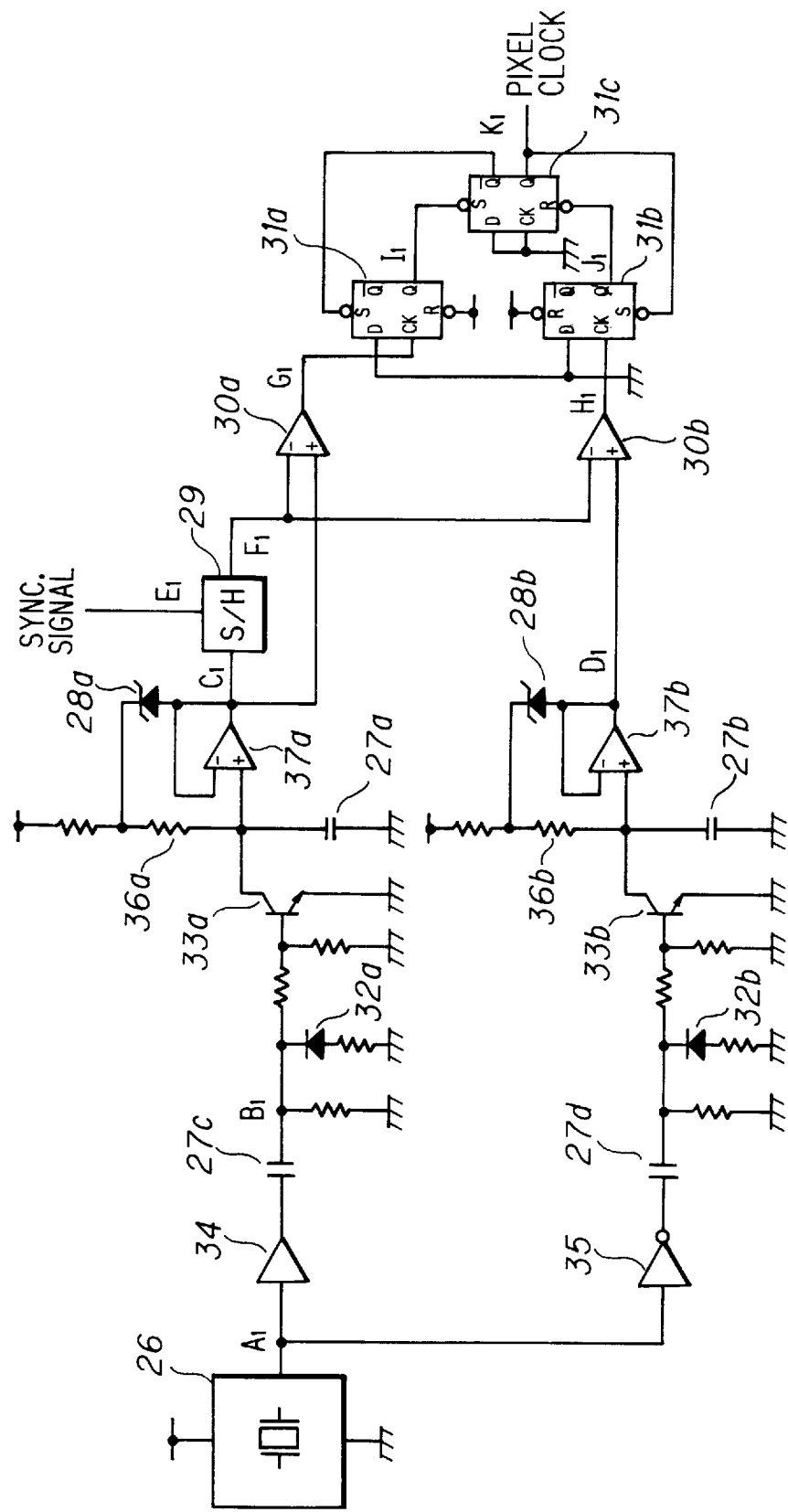
FIG. 3 is a circuit diagram showing a laser unit controlling circuit in accordance with a first embodiment.
Figure 4:
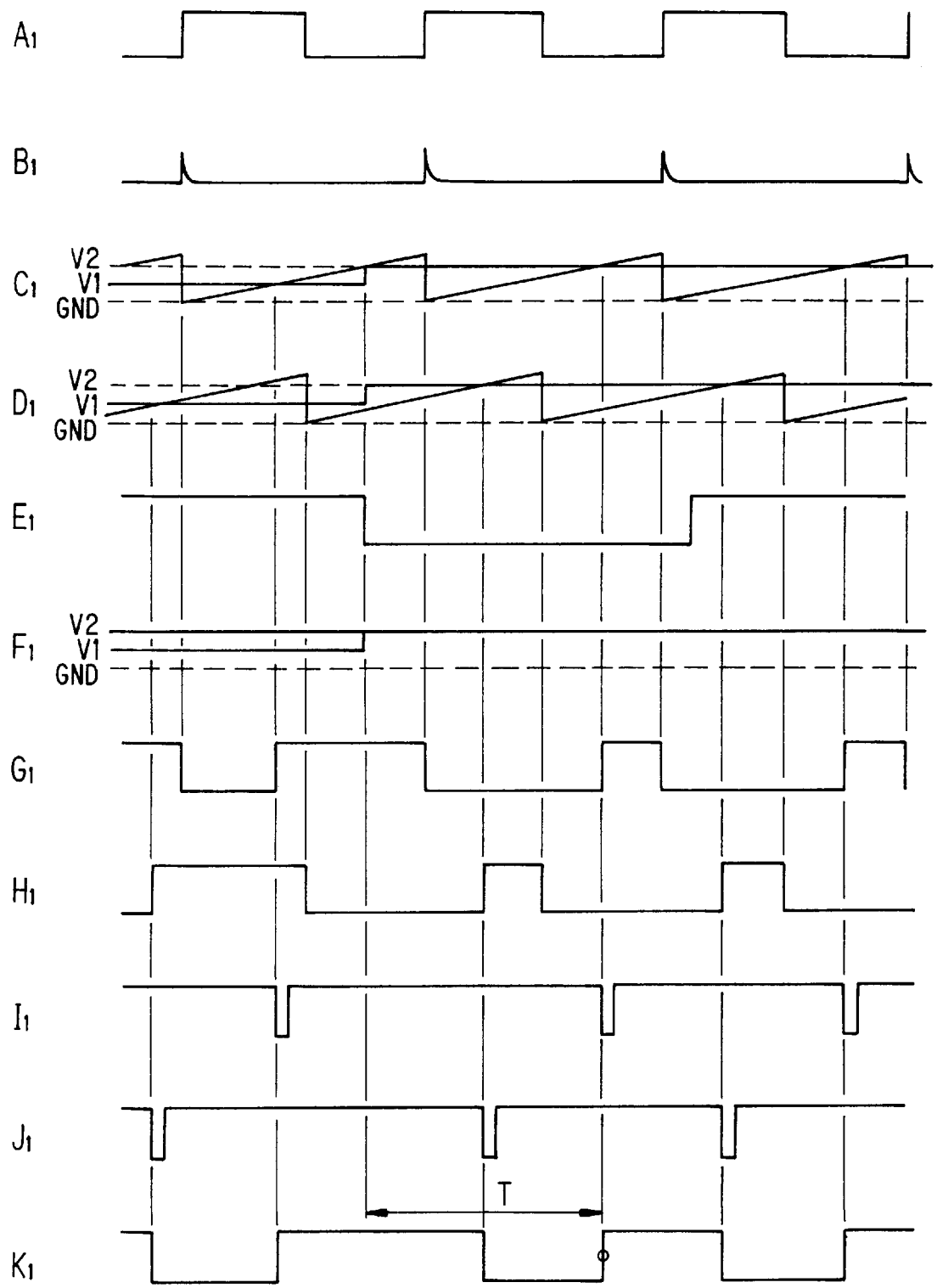
FIG. 4 is a timing chart for illustrating the operation of a first embodiment.

FIG. 3 is a circuit diagram showing a laser unit controlling circuit in accordance with a first embodiment; and FIG. 4 is a timing chart showing waveforms at points $A_1$ through $K_1$ shown in the controlling circuit shown in FIG. 3.

An oscillator 26 generates a rectangular wave signal $A_1$, which is supplied to a driver 34 and an inverter 35. The rectangular wave signal $A_1$ passing through the driver 34 is differentiated by a differentiating capacitor 27c. The pulsing component on the negative-voltage side of the derivative waveform is cut out by a diode 32a so that the signal is shaped into a waveform $B_1$ shown in FIG. 4. The rectangular wave signal $A_1$ passing through the inverter 35 is shaped into a waveform (not shown) whose phase is shifted 180 from that of the waveform $B_1$. The differentiated pulse momentarily activates a transistor 33a. As the transistor 33a is turned on, a capacitor 27a is discharged so that the potential difference across the capacitor is nullified (0 V). An operational amplifier 37a functions as a voltage follower and outputs a voltage which is inputted to its non-inverted input terminal (+), specifically, the voltage applied to the capacitor 27a. As the transistor 33a is turned off, the capacitor 27a is charged through a resistor 36a. The voltage applied to the resistor 36a is controlled by a Zener diode 28a so as to be a voltage higher by a specified voltage by the Zener diode than that applied to the capacitor 27a. As a result, the current flowing through the resistor 36a is made constant. Accordingly, the charge current to the capacitor 27a is kept constant, whereby the waveform of a signal $C_1$ outputted from the operational amplifier 37a is shaped into a sawtooth wave signal as shown in FIG. 4.

A circuit configuration after the inverter 35 includes a capacitor 27d, a diode 32b, a transistor 33b, a capacitor 27b, an operational amplifier 37b, a Zener diode 28b, a resistor 36b, and is identical with the circuit after the driver 34 and will operate in a similar manner. In this case, however, since the phase is shifted by 180°, the phase of a sawtooth wave signal $D_1$ outputted from the operational amplifier 37b is also shifted by 180° relative to the sawtooth wave signal $C_1$, as shown in FIG. 4.

The reason why the two sawtooth wave signals $C_1$, $D_1$ shifted by 180° from one another are produced is to obtain a final pixel clock $K_1$ of a rectangular wave which alternates "H" and "L" in the same cycle with that of the rectangular wave signal $A_1$ from the oscillator 26.

Designated at 29 is a sample-hold IC, which holds the voltage value of the sawtooth wave signal $C_1$ at the trailing edge of a synchronizing signal $E_1$ to produce a signal $F_1$. The synchronizing signal $E_1$ is that outputted from the aforementioned photosensor 25. In FIG. 4, the signal $F_1$ is initially held at V1 (V) and then transited to be held at V2 (V) at the time when the synchronizing signal $E_1$ falls.

A comparator 30a produces an output signal $G_1$ which goes HIGH ('H') when (sample-hold voltage $F_1$=V2)< (sawtooth voltage $C_1$). Another comparator 30b produces an output signal $H_1$ which goes 'H' when (sample-hold voltage $F_1$=V2)<(sawtooth voltage $D_1$). In the case shown in FIG. 4, the sawtooth voltages $C_1$ and $D_1$ are compared with V1 before the synchronizing signal $E_1$ falls and then compared with V2 after the synchronizing signal $E_1$ falls.

Reference numerals 31a, 31b and 31c designate D-type flip-flops with set and reset terminals S and R. Since the flip-flop 31a is connected at its data terminal D to the ground GND, a signal $I_1$ outputted from its Q-terminal goes LOW ('L') when the signal $G_1$ rises. As the signal $I_1$ goes 'L' and therefore the set terminal S of the flip-flop 31c becomes active, the pixel clock $K_1$ as an output from Q-terminal goes 'H'. When NOT-Q-terminal of the flip-flop 31c goes 'L' and therefore the set terminal S of the flip-flop 31a is made active, the signal $I_1$ immediately returns to 'H' again.

Analogously, the flip-flop 31b is connected at its data terminal D to the ground GND therefore a signal $J_1$ outputted from its Q-terminal goes 'L' when the signal $H_1$ rises. As the signal $J_1$ goes 'L', the set terminal R of the flip-flop 31c becomes active, the pixel clock $K_1$ as an output from Q-terminal goes 'L'. Since the pixel clock $K_1$ which is 'L' is inputted to a set terminal S of the flip-flop 31b, the signal $J_1$ immediately returns to 'H' again.

Every time the signal $J_1$ goes 'L', the pixel clock $K_1$ falls while the pixel clock $K_1$ rises every time the signal $I_1$, goes 'L'. Thus, the pixel clock $K_1$ as a reference signal for creating pixels is generated by the repetitions of the rise and fall. The cyclic period and duty ratio of the pixel clock $K_1$ coincide with those of the rectangular wave signal $A_1$ from the oscillator 26. As shown in FIG. 4, an interval T from the time when the synchronizing signal $E_1$ falls to the first rise of the pixel clock $K_1$ corresponds to one-cycle period of the sawtooth wave (that is, one-cycle period of the rectangular wave signal $A_1$ from the oscillator 26) and is kept constant at any time. Accordingly, the formation of pixels based on the pixel clock $K_1$ keeps a constant time relation with the falling timing of the synchronizing signal $E_1$.

In other words, since the voltage value of the sawtooth wave signal $C_1$ as an analog periodic signal is sampled as the signal $F_1$ in accordance with the time when the synchronizing signal is generated, it is possible to obtain, as a voltage value, the generating timing of the synchronizing signal $E_1$ relative to the rectangular wave signal $A_1$ outputted as a reference from the oscillator 26. By comparing this voltage value with the sawtooth wave signal $C_1$ as an analog periodic signal, it is possible to generate a pixel clock $K_1$ whose phase is continuously shifted and therefore precisely in phase with the generating timing of the synchronizing signal $E_1$.

Thus, it become possible to use the oscillator 26 having the same cycle with that of the one-pixel cycle of the pixel clock $K_1$. That is, there is no need of using an oscillator of a higher oscillating frequency as used in the conventional example 1), therefore it is possible to avoid the difficulty in designing the circuit as well as the increase of the cost. Besides, since there is no need of preparing many number of clock signals which are delayed from one another by minute steps as in the conventional example 2), it is possible to prepare a pixel clock $K_1$ which exactly keeps a constant time relation with the synchronizing signal $E_1$.

Since the sawtooth wave signals $C_1$, $D_1$ which vary linearly in their voltage, are used as the analog periodic. signals to be compared with the sample-hold values, it is possible to make the comparison with good precision. Further, this feature enables the analog periodic signal-generating circuit to be designed in a relatively simplified configuration.

(SECOND EMBODIMENT)

Figure 5:
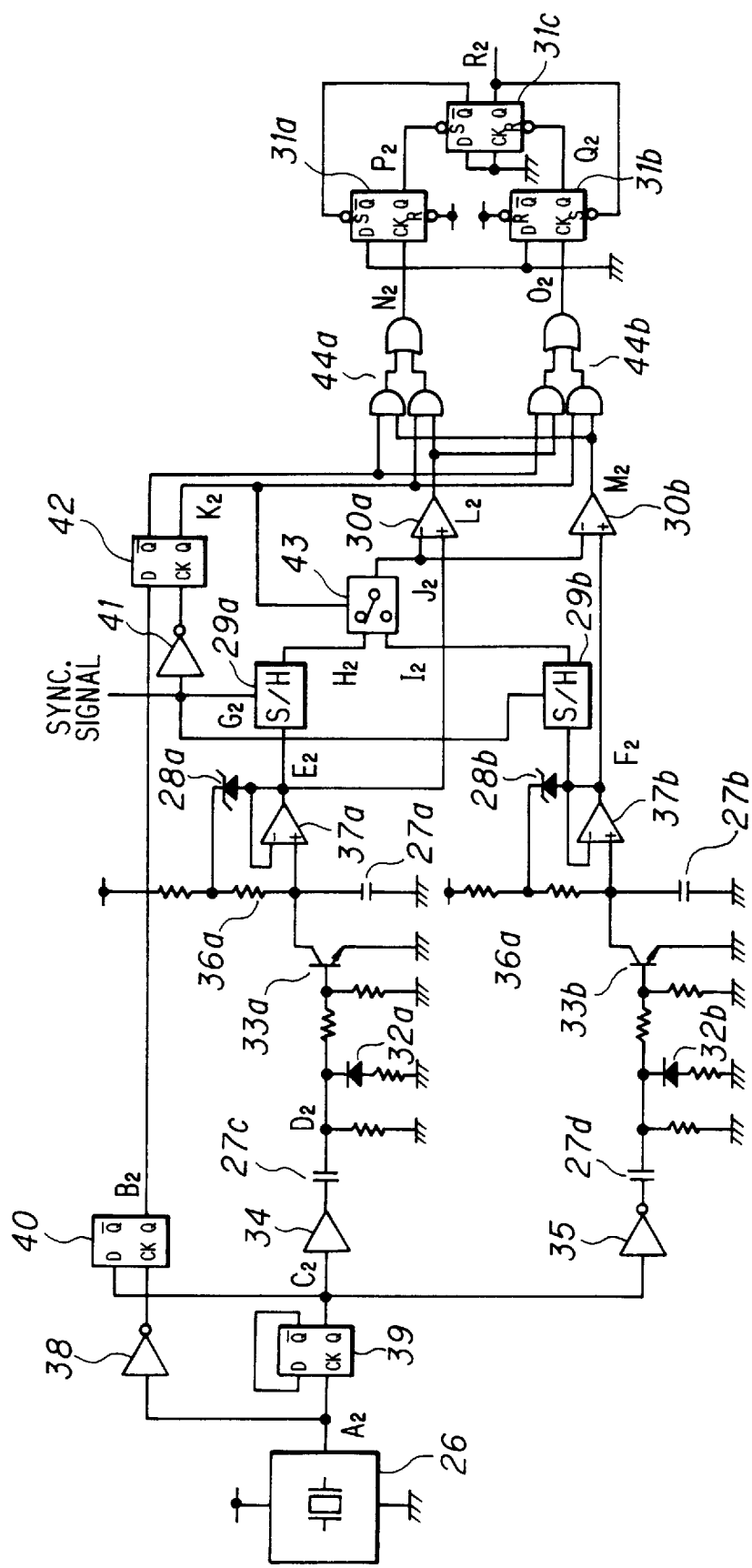
FIG. 5 is a circuit diagram showing a laser unit controlling circuit in accordance with a second embodiment.

FIG. 5 is a circuit diagram showing a laser unit controlling circuit in accordance with a second embodiment; and FIG.

6 is a timing chart showing waveforms at points $A_2$ through $R_2$ shown in the controlling circuit shown in FIG. 5. The same components as in FIG. 3 are allotted with the same reference numerals.

An oscillator 26 generates a rectangular wave signal $A_2$, whose pulse number is halved in a flip-flop 39 to produce a rectangular wave signal $C_2$. The thus formed signal $C_2$ is supplied to a driver 34 and an inverter 35. The procedures from the driver 34 and inverter 35 to the formation of sawtooth wave signals $E_2$ and $F_2$ are the same with those described with reference to FIGS. 3 and 4. Sample-hold ICs 29$a$, 29$b$ sample and hold sawtooth wave signals $E_2$ and $F_2$ at the timing of the trailing edge of a synchronizing signal $G_2$, to produce signals $H_2$ and $I_2$, respectively.

Figure 6:
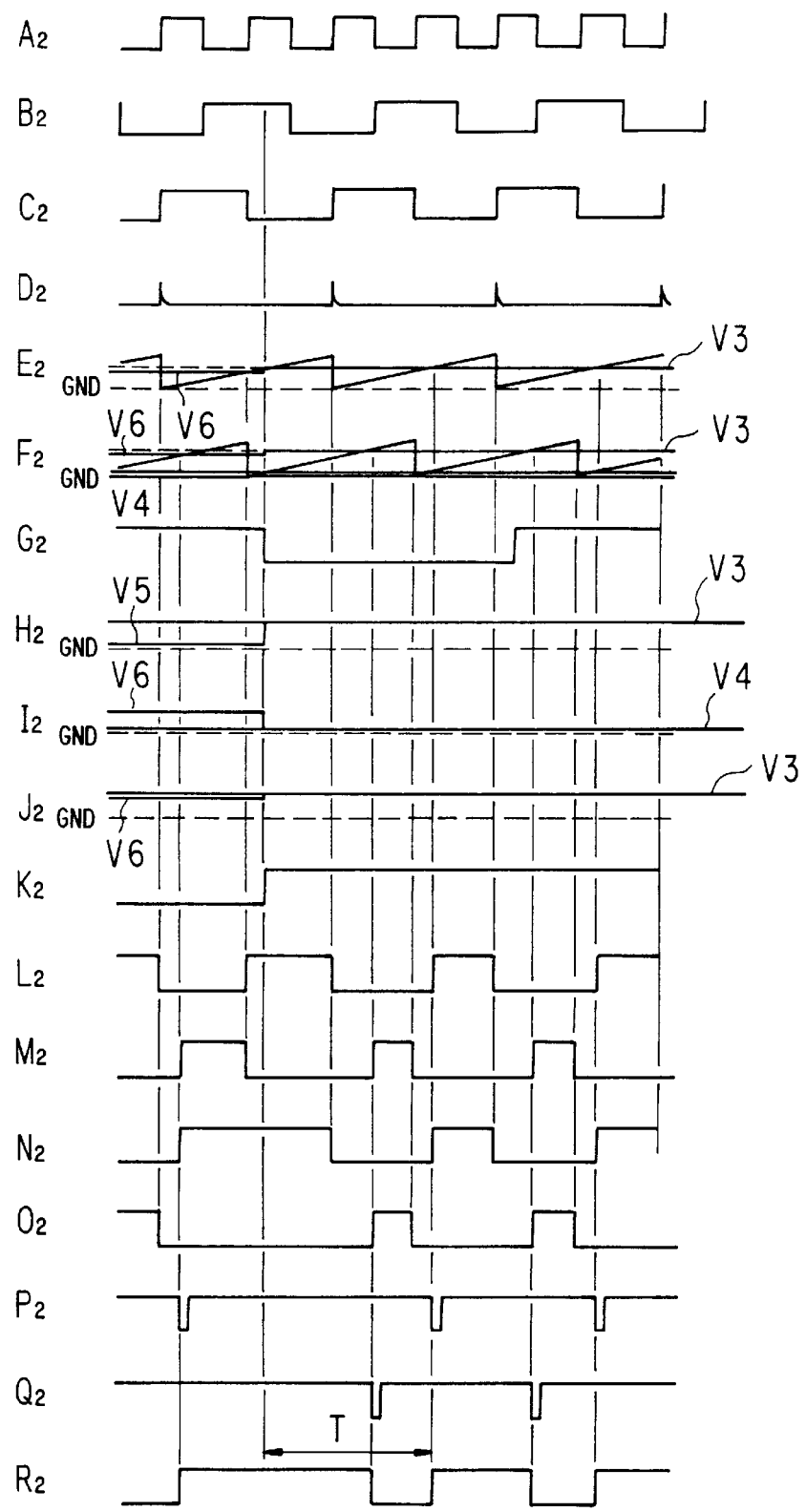
FIG. 6 is a timing chart for illustrating the operation of a second embodiment.

Since the rectangular wave signal $A_2$ from the oscillator 26 is inputted through an inverter 38 to the clock terminal CK of a flip-flop 40 while the data terminal D of the flip-flop 40 is supplied with the rectangular wave signal $C_2$, a rectangular wave signal $B_2$ which is outputted from the Q-terminal of the flip-flop 40 differs in phase by 90° from that the rectangular wave signal $C_2$ (with respect to the rectangular wave signal $A_2$), as shown in FIG. 6. Since the rectangular wave signal $B_2$ is inputted to the data terminal D of a flip-flop 42 while the synchronizing signal $G_2$ is inverted in an inverter 41 and the inverted signal is inputted to the clock terminal CK, the flip-flop 42 picks up the state of the rectangular wave signal $B_2$ at the time when the synchronizing signal $G_2$ falls, to thereby output a signal $K_2$ from the Q-terminal.

As shown in FIG. 6, the signal $B_2$ goes 'H' around the center of the rising slope of the sawtooth wave signal $E_2$. In contrast, the signal $B_2$ goes 'L' around the center of the rising slope of the sawtooth wave signal $F_2$.

The signals $H_2$ and $I_2$ which has been produced by respective sample-hold ICs are inputted to the inverted input terminals (–) to comparators 30$a$, 30$b$ through an analog switch 43. The analog switch 43 selects the signal $H_2$ when the signal $K_2$ is 'H' and selects the signal $I_2$ when the signal $K_2$ is 'L' as a signal $J_2$. That is, of the two sawtooth wave signal $E_2$ and $F_2$, one whose phase stays nearer to the center of its rising slope at the time when the synchronizing signal $G_2$ falls, will be selected as a sample-hold value and outputted as the signal $J_2$. In the case shown in FIG. 6, the signal $E_2$ (voltage value $V_3$) is selected. The signal $J_2$ is compared with the sawtooth wave signal $E_2$ and $F_2$ in the comparators 30$a$ and 30$b$, respectively.

Since the sample-hold signal $J_2$ is formed by the switching between the signals $H_2$ and $I_2$ in accordance with the input timing of the synchronizing signal $G_2$, it is necessary to assign signals $L_2$ and $M_2$ outputted from the comparators 30$a$ and 30$b$ based on the selected result of the signal $J_2$ to either $N_2$ or $O_2$, in order to allow flip-flops 31$a$, 31$b$ and 31$c$ to operate in the same manner as in the first embodiment. An AND/OR circuit 44$a$ selects the signal $L_2$ when the signal $K_2$ is 'H' and the signal $M_2$ when the signal $K_2$ is 'L' to output it as the signal $N_2$. In contrast, another AND/OR circuit 44$b$ selects the signal $M_2$ when the signal $K_2$ is 'H' and the signal $L_2$ when the signal $K_2$ is 'L' to output it as the signal $O_2$.

As shown in FIG. 6, of the two sample-hold voltages of the sawtooth wave signals $E_2$ and $F_2$, the sample-hold value which is picked up at a phase nearer to the center of the rising slope in the sawtooth signal is selected as an effective value. In the case shown in FIG. 6, at the time when the synchronizing signal $G_2$ falls, the signal $E_2$ is V3(V) while the signal $F_2$ is V4 (V), which are outputted as the signals $H_2$ and $I_2$, respectively. The one which is sampled in the vicinity of the center of the rising slope is V3 (V). Since the signal $B_2$ is 'H' at the time when the synchronizing signal $G_2$ falls and therefore the signal $K_2$ is set into 'H', the analog switch 43 selects V3 (V) of the signal $H_2$ to output it as the signal $J_2$.

In a case where an analog periodic signal which is to be sampled as a comparing reference value is of a sawtooth wave, the voltage value varies shapely around the peaks of the sawtooth wave. If the synchronizing signal is inputted at that timing and the sample-holding of the sawtooth signal is performed, there is a fear that the sample-hold value might become uncertain. In this embodiment, two sawtooth wave signals having a phase difference of 180° are used and of the two sawtooth wave signals, one whose phase stays nearer to the center of its rising slope at the time when the synchronizing signal is inputted, is sampled. Accordingly, it is possible to automatically avoid sampling a point around the turning point where the voltage value varies sharply. This feature permits definite selection of a sample hold value, whereby it is possible to set up an exactly constant interval T from the time when the synchronizing signal $G_2$ falls to the first rise of a pixel clock $R_2$, (the interval T which is equal to one-cycle period of the sawtooth wave).

(THIRD EMBODIMENT)

Figure 7:
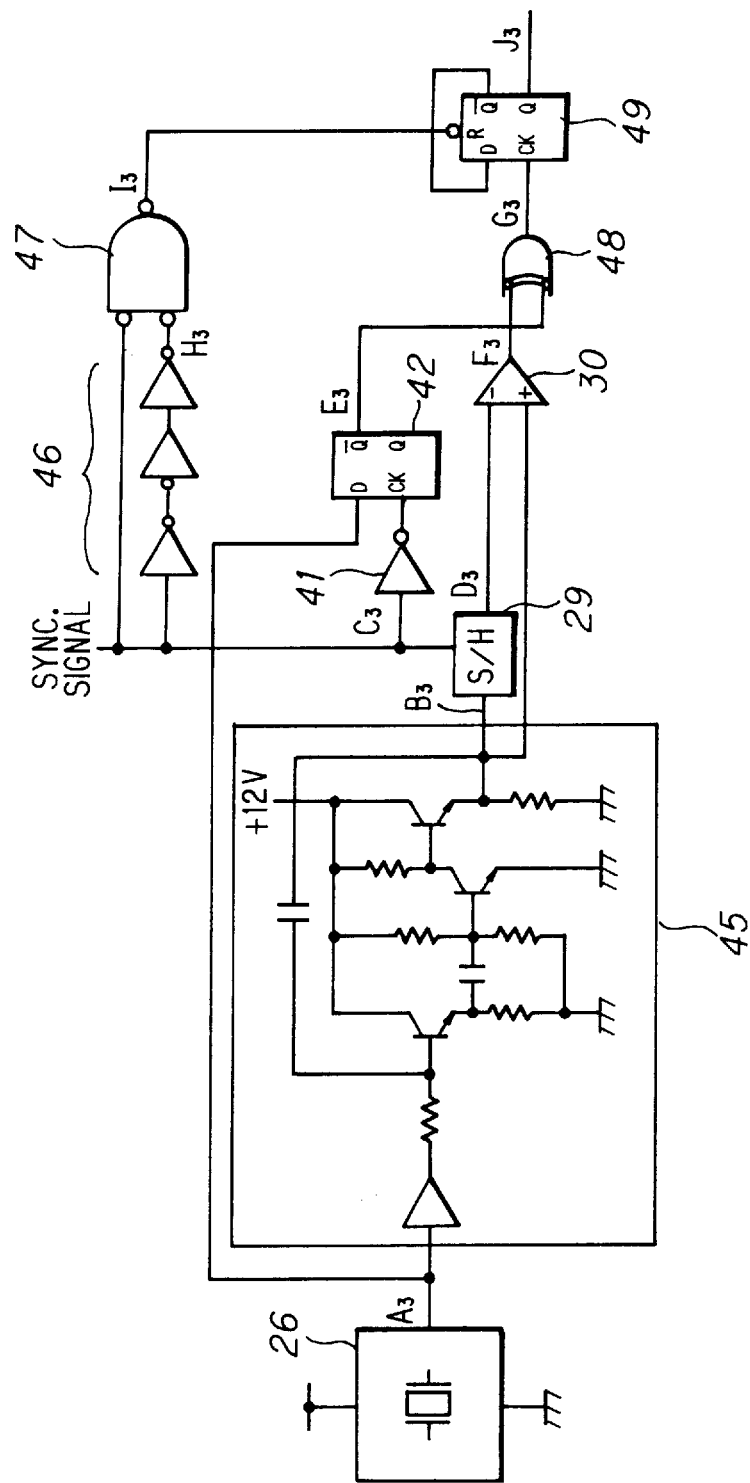
FIG. 7 is a circuit diagram showing a laser unit controlling circuit in accordance with a third embodiment.
Figure 8:
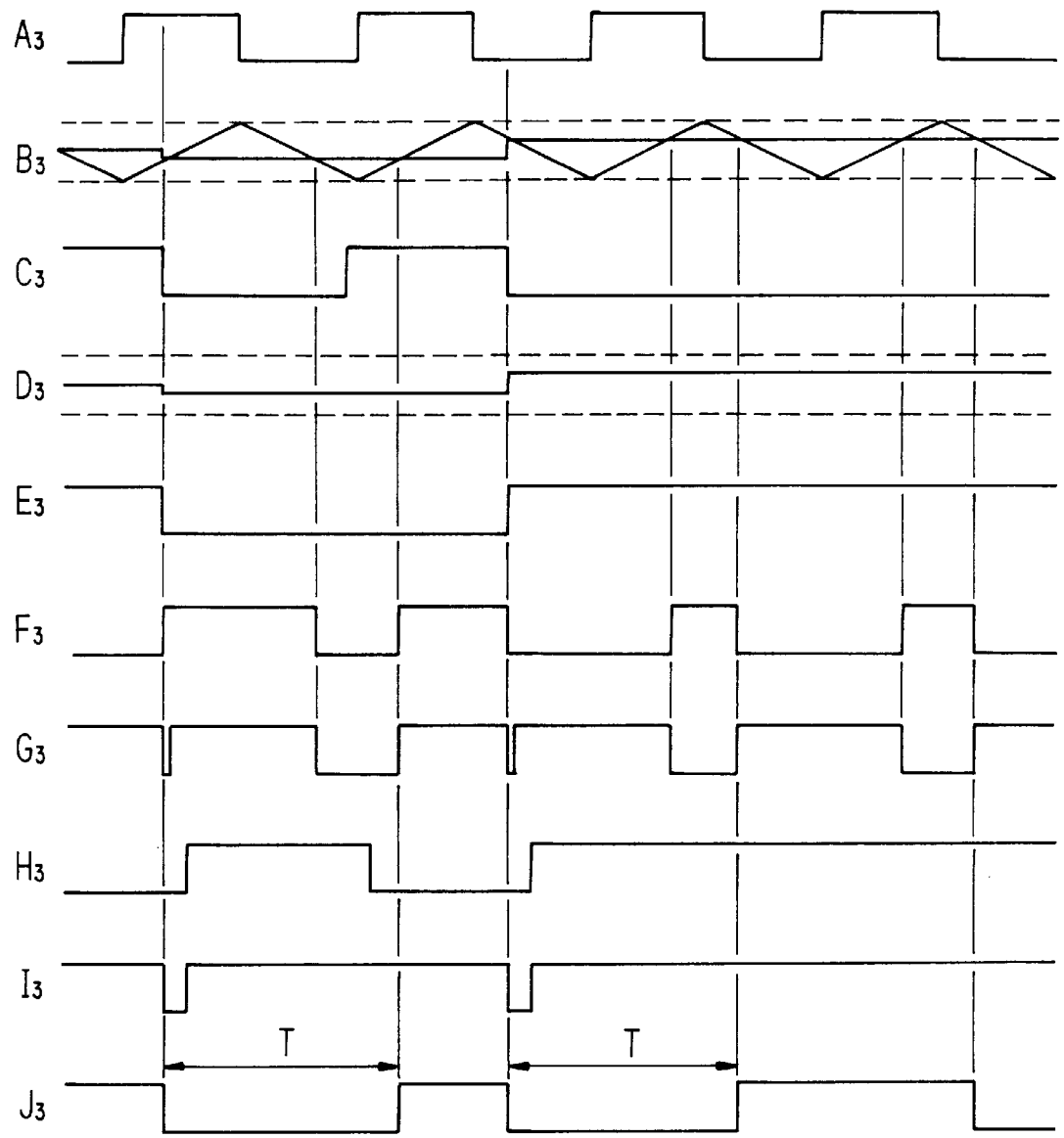
FIG. 8 is a timing chart for illustrating the operation of a third embodiment.

FIG. 7 is a circuit diagram showing a laser unit controlling circuit in accordance with a third embodiment; and FIG. 8 is a timing ch art showing waveforms at points $A_3$ through $J_3$ shown in the controlling circuit shown in FIG. 7. The same components as in FIGS. 3 and 5 are allotted with the same reference numerals.

Designated at 45 is a typical Miller integrating circuit which inputs a rectangular wave signal $A_3$ from an oscillator 26 to generate a chopping wave signal $B_3$ as shown in FIG. 8. The chopping wave signal $B_3$is in a rising slope during the rectangular wave signal $A_3$ is 'H' while the chopping wave signal $B_3$ is in a falling slope during the rectangular wave signal $A_3$ is 'L'.

A sample-hold IC 29 samples and holds the voltage value of the chopping wave signal $B_3$ at the trailing edge of a synchronizing signal $C_3$ to produce a signal $D_3$. The synchronizing signal $C_3$ is inverted by the inverter 41 and the inverted signal is supplied to the clock terminal CK of a flip-flop 42 while the data terminal D of the same flip-flop is supplied with the rectangular wave signal $A_3$. Accordingly, the flip-flop 42 samples the voltage of the rectangular wave signal $A_3$ at the time when the synchronizing signal $C_3$ falls, an d outputs the inverted value as a signal $E_3$ through the NOT-Q output.

A comparator 30 compares the sample hold signal $D_3$ with the chopping wave signal $B_3$. If $D_3<B_3$, the comparator 30 produces 'H' as an output signal $F_3$. If $D_3 >B_3$, the comparator 30 produces 'L' as the value of the output signal $F_3$.

An XOR gate 48 takes an exclusive OR between signals $E_3$ and $F_3$ to output a signal $G_3$. When the synchronizing signal $C_3$ falls during the rising trend of the chopping wave signal $B_3$, the signal $E_3$ goes 'L'. When the synchronizing signal $C_3$ falls during the falling trend of the chopping wave signal $B_3$, the signal $E_3$ goes 'H'. When the signal $E_3$ remains 'L', the signal $G_3$ presents the state equal to that of the signal $F_3$. When the signal $E_3$ occupies 'H', the signal $G_3$ presents the inverted state of the signal $F_3$.

A flip-flop 49 inverts the output state of Q-terminal at the timing of the rising edge of the signal $G_3$. Accordingly, when the synchronizing signal $C_3$ is sampled during the rising trend of the chopping wave signal $B_3$, edges which occur in the signal $F_3$ during the rising trend of the chopping wave signal $B_3$ become valid. Conversely, when the synchronizing signal $C_3$ is sampled during the falling trend of the chopping wave signal $B_3$, edges which occur in the signal $F_3$ during the falling trend of the chopping wave signal $B_3$ become valid.

Since the state of the Q-terminal of the flip-flop 49 is unstable when the synchronizing signal $C_3$ is inputted, the flip-flop 49 is made reset at the time when the synchronizing signal $C_3$ is inputted. A delay inverting portion 46 comprising three inverters, inverts the synchronizing signal $C_3$ and introduces a small delay to the signal to produce a signal $H_3$. An OR gate 47 causes its output signal $I_3$ to be set at 'L' only when the synchronizing signal $C_3$ is 'L' and the inverted and delayed signal $H_3$ is 'L'. As shown in FIG. 8, only the moment the synchronizing signal $C_3$ falls, the synchronizing signal $C_3$ and the signal $H_3$ are simultaneously set at 'L'. The flip-flop 49 is reset by the signal $I_3$ when it goes 'L'. As a result, the output from the flip-flop 49 or a pixel clock $J_3$ once goes 'L' at the timing of the falling edge of the synchronizing signal $C_3$ and is made to rise after the elapse of the one-cycle period T of the chopping wave signal $B_3$. That is, in either case that the rectangular wave signal $A_3$ from the oscillator 26 is 'H' or 'L', the pixel clock $J_3$ falls when the synchronizing signal $C_3$ falls, and rises when the signal $G_3$ rises. Therefore, the duration from the time when the synchronizing signal $C_3$ falls to a first rise of the pixel clock $J_3$ corresponds to the cyclic period T of the chopping wave signal $B_3$ at any time.

In accordance with this embodiment, even if the synchronizing signal $C_3$ is inputted at the timing near the turning point where the trend of the voltage of the analog periodic signal changes, the sample-hold value will not present a great error. This is because that a chopping wave signal $B_3$ is used as the analog periodic signal and the chopping wave signal $B_3$ will not vary sharply. As a result, it is possible to generate a pixel clock $J_3$ which is stable at any time.

(FOURTH EMBODIMENT)

Figure 9:
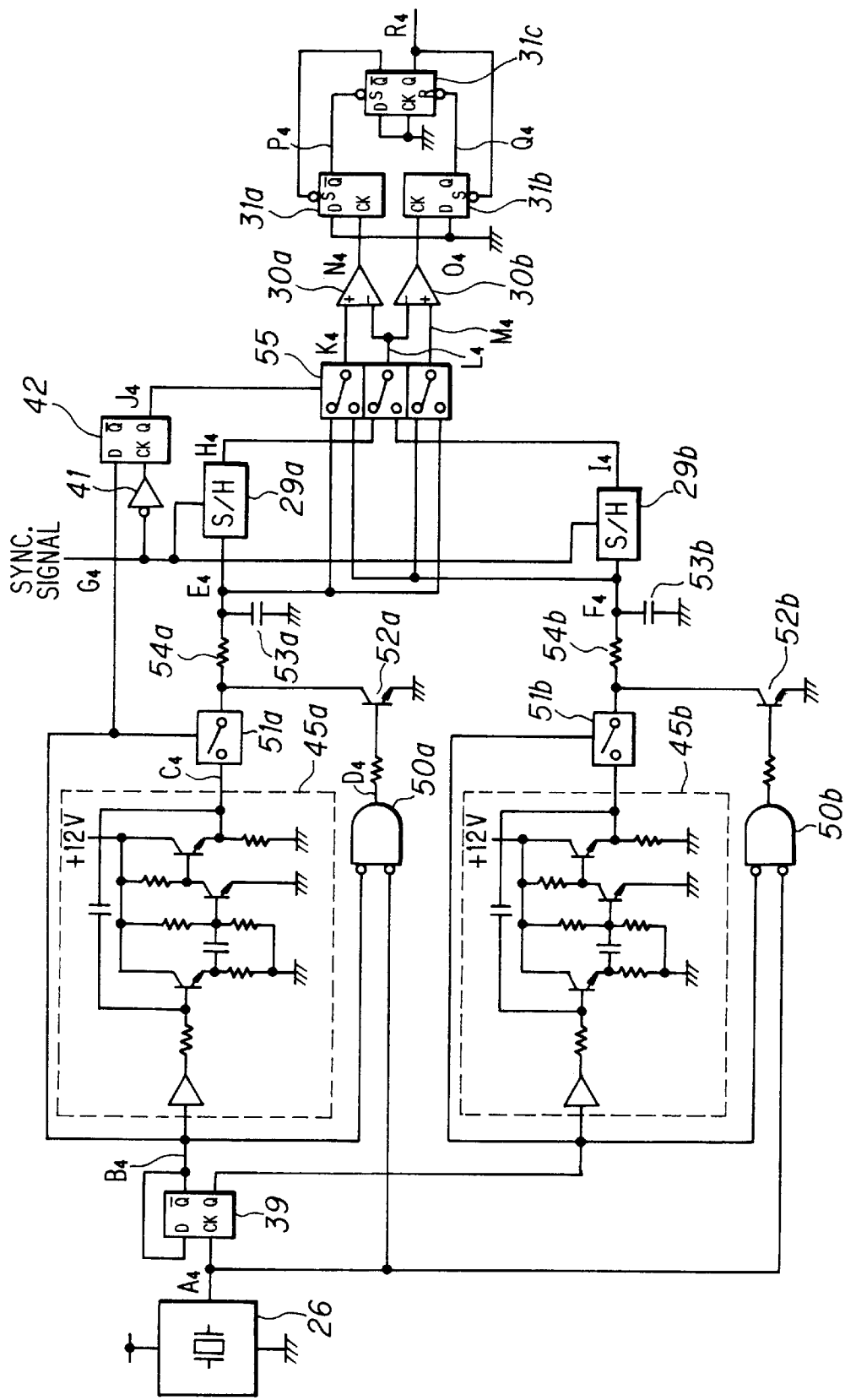
FIG. 9 is a circuit diagram showing a laser unit controlling circuit in accordance with a fourth embodiment.
Figure 10:
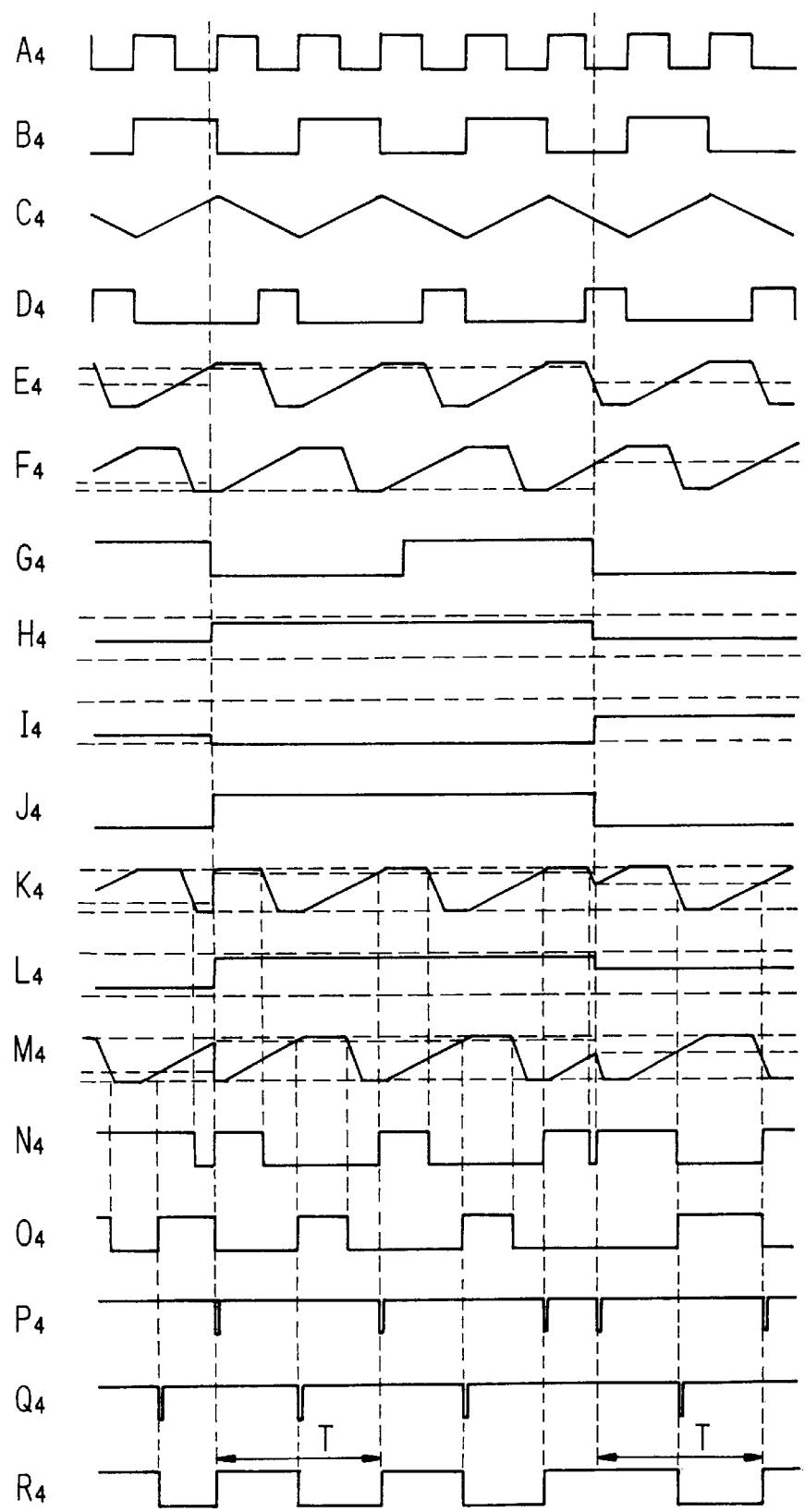
FIG. 10 is a timing chart for illustrating the operation of a fourth embodiment.

FIG. 9 is a circuit diagram showing a laser unit controlling circuit in accordance with a fourth embodiment; and FIG. 10 is a timing chart showing waveforms at points $A_4$ through $R_4$ shown in the controlling circuit shown in FIG. 9. The same components as in FIGS. 3, 5 and 7 are allotted with the same reference numerals.

An oscillator 26 generates a rectangular wave signal $A_4$, whose pulse number is divided in a flip-flop 39 whose Q-terminal and NOT Q-terminal output rectangular wave signals which a re identical in shape but have a phase difference of 180° from each other. The rectangular wave signal from the NOT Q-terminal is designated at $B_4$. The rectangular wave signal $B_4$ is supplied to a Miller integrating circuit 45a to produce a chopping wave signal $C_4$, which in turn is supplied to an analog switch 51a. The other rectangular wave signal which is outputted from the Q-terminal of the flip-flop 39 is supplied to another Miller integrating circuit 45b to produce a chopping wave signal (not shown) which differs in phase of 180° from the chopping wave signal $C_4$. This chopping wave signal is supplied to another analog switch 51b. The analog switches 51a and 51b are controlled by respective rectangular wave signals, (the switch 51a is controlled by the rectangular wave signal $B_4$ and the other one is not shown) which are used for preparing the chopping waves. When the rectangular wave signals are 'H' and the voltage of the chopping wave signal rises, the analog switches 51a, 51b are turned on, so that capacitors 53a and 53b are charged through current limiting resistors 54a, 54b. The NOR gate 50a is inputted with the rectangular wave signal $A_4$ from the oscillator 26 and the rectangular wave signal $B_4$ for preparing chopping waves from the flip-flop 39 and outputs a signal $D_4$ which becomes 'H' in the rear half of the falling time of the chopping wave signal $C_4$. As this signal $D_4$ is inputted to a transistor 52a, stored charges are released from a capacitor 53a while the signal $D_4$ is 'H'. During the time from the end of the rising slope of the chopping wave signal $C_4$ until the activation of the transistor 52a and in the front half of the falling duration of the chopping wave signal $C_4$, all the elements connected to the capacitor 53a have high-impedances so that the charged voltage will be maintained. As a result, the voltage waveform of the capacitor 53a varies as shown in $E_4$ in FIG. 10. A NOR-gate 50b as well as a transistor 52b will operate in the same manner and the voltage waveform of a capacitor 53b varies as shown in $F_4$ in FIG. 10. In this way, the signals $E_4$ and $F_4$ which are produced based on chopping waves have the same trapezoidal features having a phase difference of 180°.

The trapezoidal-shaped wave signals $E_4$ and $F_4$ are inputted to sample-hold ICs 29a and 29b, respectively and also supplied to an analog switch array 55 of three switches. The sample-hold ICs 29a and 29b are the same with those described in the foregoing embodiments, and sample and hold the values of the signals $E_4$ and $F_4$, receptively at the timing of the falling edge of the synchronizing signal $G_4$, to thereby output respective signals $H_4$ and $I_4$. The combination of an inverter 41 and a flip-flop 42 produces a signal $J_4$ which represents the state of the rectangular wave signal $B_4$ at the timing of falling edge of the synchronizing signal $G_4$. If the output signal $E_4$ from the upper trapezoidal-wave circuit composed of elements 45a through 54a is during the rising trend, the signal $J_4$ is made 'H' while the signal $J_4$ is made 'L' if the output signal $F_4$ from the lower trapezoidal-wave circuit is during the rising trend at the timing of falling edge of the synchronizing signal $G_4$.

The analog switch array 55 of three switches outputs $E_4$, $H_4$ and $F_4$ as signals $K_4$, $L_4$ and $M_4$, respectively when the signal $J_4$ from the flip-flop 42 is 'H' and the switch array outputs $F_4$, $I_4$ and $E_4$ as $K_4$, $L_4$ and $M_4$, respectively when the signal $J_4$ is 'L'.

When the synchronizing signal $G_4$ falls during the rising time of the upper trapezoidal-wave signal $E_4$, a comparator 30a is supplied with the sample-hold signal $H_4$ sampled by the upper circuit and the trapezoidal-shaped wave signal $E_4$ in the upper circuit while another comparator 30b is inputted with the sample-hold signal $H_4$ sampled by the upper circuit and the trapezoidal-shaped wave signal $F_4$ in the lower circuit. On the other hand, when the synchronizing signal $G_4$ falls during the rising time of the lower trapezoidal-wave signal $F_4$, the comparator 30a is supplied with the sample-hold signal $I_4$ sampled by the lower circuit and the trapezoidal-shaped wave signal $F_4$ in the lower circuit while the other comparator 30b is inputted with the sample-hold signal $I_4$ sampled by the lower circuit and the trapezoidal-shaped wave signal $E_4$ in the upper circuit. Therefore, whenever the synchronizing signal $G_4$ falls, an output signal $N_4$ from the comparator 30a is a compared result between the sample-hold value of one of trapezoidal-shaped wave signals which is on the rising trend and the trapezoidal-shaped wave signal itself while an output signal $O_4$ from the comparator 30b is a compared result between the same sample-hold value and the other trapezoidal-shaped wave signal which has not been sampled.

As described in the foregoing embodiments, a pixel clock $R_4$ rises when the input signal $N_4$ to the clock terminal CK of a flip-flop 31a rises and the pixel clock $R_4$ falls when the input signal $O_4$ to the clock terminal CK to a flip-flop 31b rises. As a result, the pixel clock $R_4$ will regularly rise for the first time after an elapse of a constant time T from when the synchronizing signal $G_4$ falls, thereby it is possible to produce a pixel clock $R_4$ which counts in association with the synchronizing signal $G_4$.

In accordance with this embodiment, since two trapezoidal wave signals $E_4$ and $F_4$ which have the same maximum but a phase difference of 180° are used as analog periodic signals, even if the synchronizing signal $G_4$ is inputted around a time at which the two signals are changed over, either one of the signals will be in the phase in which the value of the signal changes slowly. Since the value which changes slowly is sampled as a sample-hold signal, it is possible to obtain a sample-hold value which contains a smaller error as compared to the method using a chopping wave signal in the third embodiment. Thus, it is possible to prepare a pixel clock R4 which is further stabilized.

(FIFTH EMBODIMENT)

Figure 11:
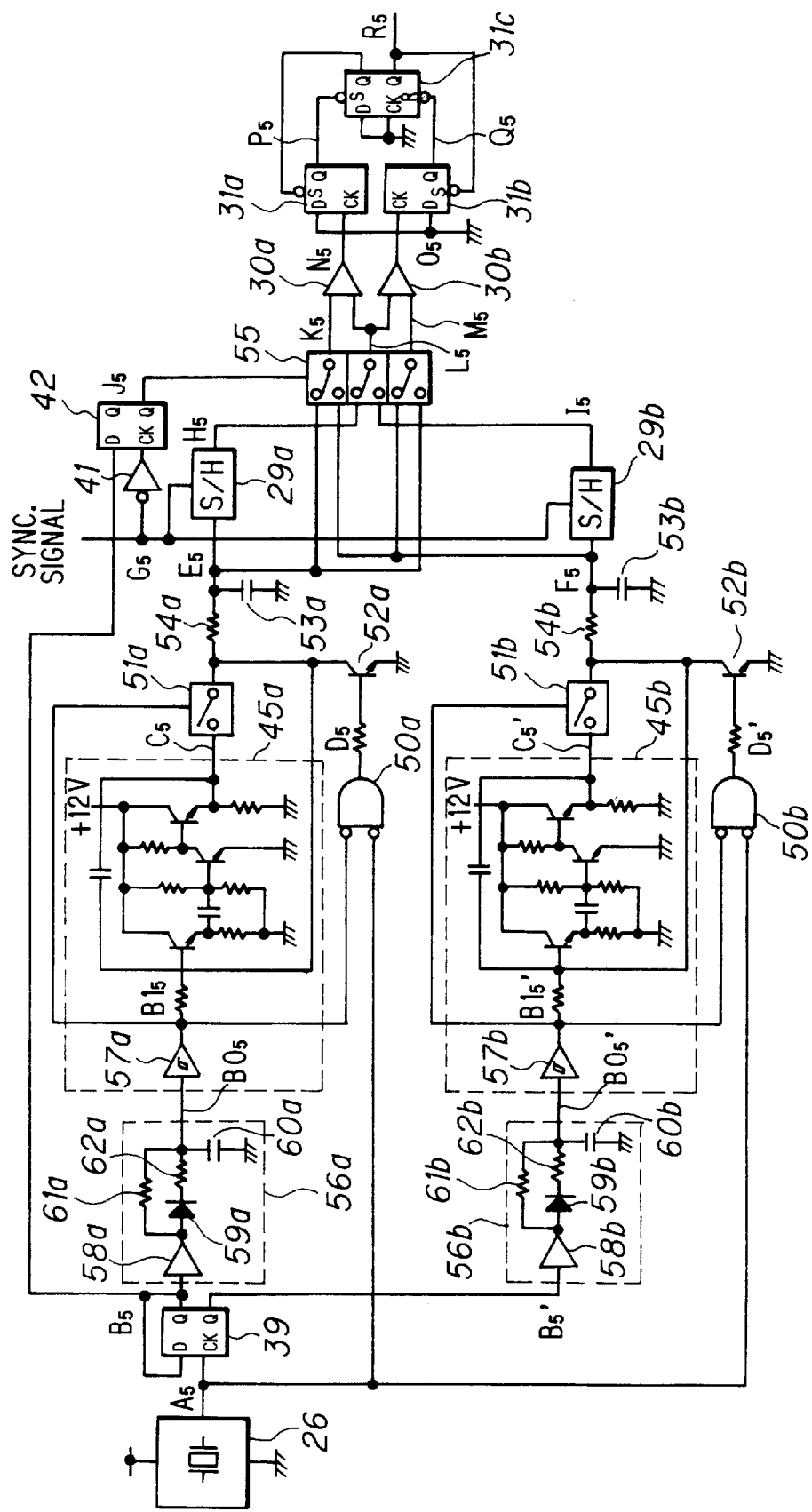
FIG. 11 is a circuit diagram showing a laser unit controlling circuit in accordance with a fifth embodiment.
Figure 12:
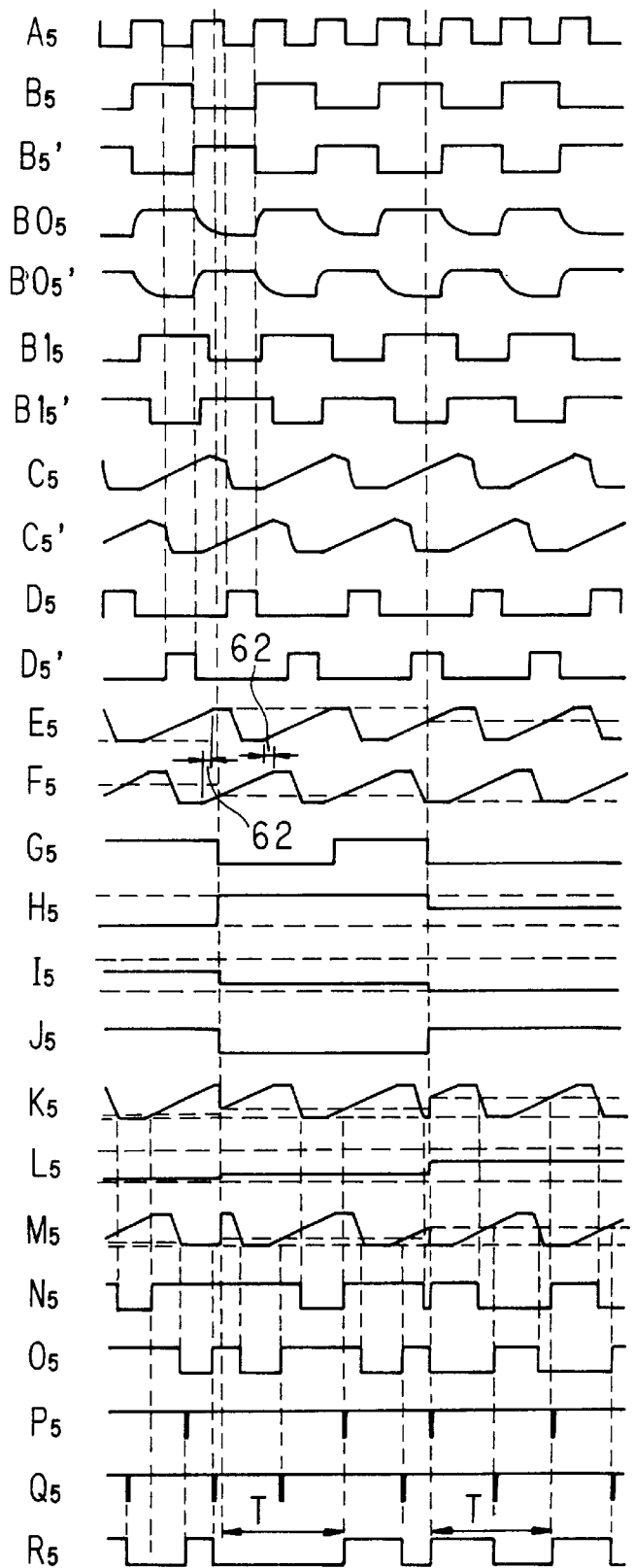
FIG. 12 is a timing chart for illustrating the operation of a fifth embodiment.

FIG. 11 is a circuit diagram showing a laser unit controlling circuit in accordance with a fifth embodiment; and FIG. 12 is a timing chart showing waveforms at points $A_5$ through $R_5$ shown in the controlling circuit shown in FIG. 11. The same components as in FIG. 9 are allotted with the same reference numerals. The fifth embodiment is almost the same with the fourth embodiment except that a delay circuits 56a, 56b and Schmitt trigger type drivers 57a, 57b are provided. Therefore, description of the components other than these will be omitted.

Two rectangular wave signals $B_5$ and $B_5'$ which have been formed in a flip-flop 39 by dividing an input rectangular wave signal $A_4$ and have a phase difference of 180° from each other are supplied to buffers 58a and 58b, respectively. Each wave signal $B_5$ or $B_5'$ is inputted through the buffer 58a (or 58b) to a parallel circuit of a diode 59a (or 59b) and a resistor 61a (or 61b). When the signal $B_5$ (or $B_5'$) is 'H', a capacitor 60a (or 60b) is charged up by both the passage through the diode 59a (or 59b) and a resistor 62a (or 62b) and the passage through the resistor 61a (or 61b). In contrast, when the signal $B_5$ (or $B_5'$) is 'L', the diode 59a (or 59b) will flow no current because of the reverse bias, therefore the stored charges on the capacitor 60a (or 60b) are released through the resistor 61a (or 61b). Accordingly, as shown in FIG. 12, output signals $BO_5$ (or $BO_5'$) from the delay circuit designated at 56a (or 56b) will have a waveform in which the discharge time is longer than the charging time. When signals $BO_5$ and $BO_5'$ thus smoothly varying by virtue of the charge and discharge functions are shaped in waveform by drivers 57a and 57b of Schmitt trigger type, the two output signals result in rectangular wave signals $Bl_5$ and $Bl_5$' which are different in duty ratio. For either signal, the enable time is longer than the disable time. The duration in which one of the signals $Bl_5$ and $Bl_5'$ is 'L' is contained in the duration in which the other signal is 'H'.

Consequently, as shown in FIG. 12, Miller integrating circuits 45a and 45b output trapezoidal wave signals $C_5$ and $C_5'$ while NOR gates 50a and 50b output rectangular wave signals $D_5$ and $D_5'$. Accordingly, the trapezoidal-wave circuits produce output signals $E_5$ and $F_5$ having trapezoidal waveforms, as shown in the figure. These trapezoidal wave signals $E_5$ and $F_5$ have overlapping portions with respect to time in their rising slopes as indicated at 62. The provision of the overlaps 62 are based on the following reason: If the falling of the synchronizing signal $G_5$ occurs around the start point or end point of the rising slope of the trapezoidal wave signal, depending upon a delicate operation timing of the circuit, the value of the trapezoidal wave signal which are not in the rising trend, e.g. the saturated maximum voltage or the minimum voltage 0 (V), might be sampled as a sample hold signal. If this happens, the circuits following the sample hold ICs 29a, 29b could not operate normally and the edge timing of a pixel clock $R_5$ to be correspondent with the synchronizing signal $G_5$ could be disordered.

In contrast, in the configuration of this embodiment, since the rising portions of the trapezoidal wave signals $E_5$ and $F_5$ are overlapped with respect to time in the portions 62, it is always possible to sample a voltage which belongs to a rising portion even if some time lag occurs, thus making sure the edge timing of the pixel clock $R_5$ which is to be correspondent with the synchronizing signal $G_5$ is prevented from being out of order.

(SIXTH EMBODIMENT)

Figure 13:
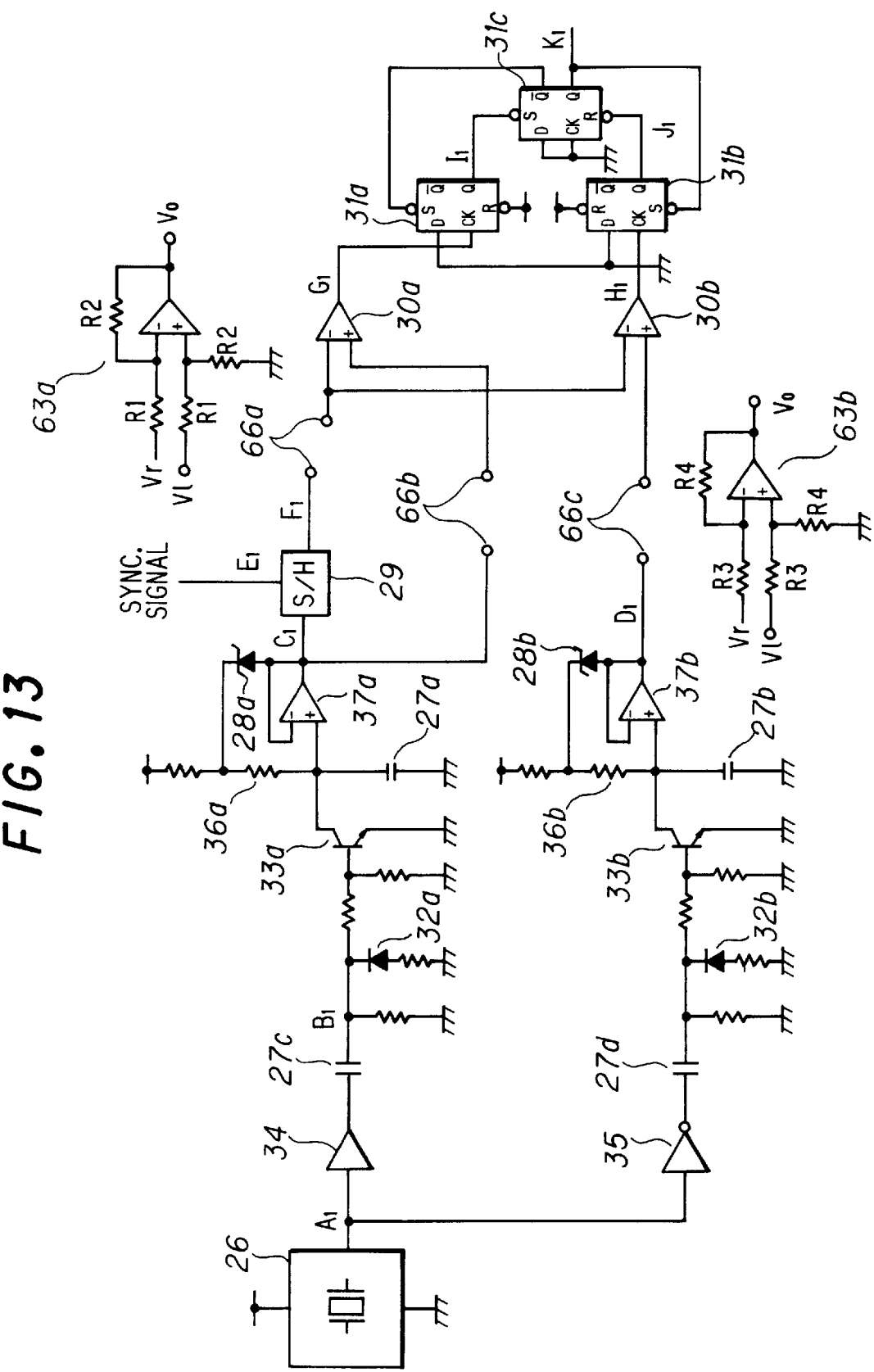
FIG. 13 is a circuit diagram showing a laser unit controlling circuit in accordance with a sixth embodiment.

FIG. 13 is a circuit diagram showing a laser unit controlling circuit in accordance with a sixth embodiment. This embodiment corresponds to a circuit configuration of the first embodiment (FIG. 3) in which differential amplifying circuits are connected. The same components as in FIG. 3 are allotted with the same reference numerals.

A differential amplifying circuit 63a includes a resistors R1 and R2 where R1 is set to be greater than R2 and amplifies the difference between an input voltage Vi and a reference voltage Vr to produce an output voltage Vo. Since Vo is given as Vo=(R2/R1)×(Vi−Vr) and R1>R2, the variation width of the signal will be reduced.

Figure 14:
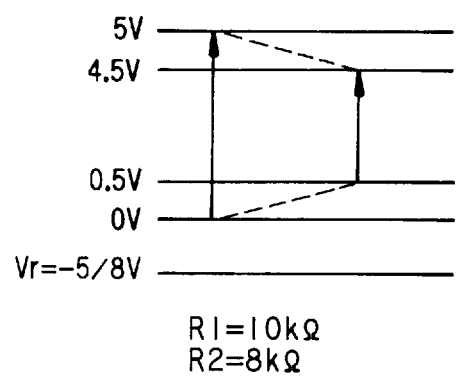
FIG. 14 is an illustrative view showing a change of range of voltage values in a sixth embodiment.

The input Vi and output Vo of the differential amplifying circuit 63a are connected between the terminals 66a while terminals 66b as well as terminals 66c are short-circuited. As shown in FIG. 14, suppose that with the reference voltage Vr =−⅝ (V), R1=10 (kΩ) and R2=8 (kΩ), the input voltage Vi varies within a range from 0 (V) to 5 (V), the output voltage Vo will vary from 0.5 (V) to 4.5 (V). That is, the variation range will be narrowed. As a result, the sample-hold values at the timing of the falling edges of the synchronizing signal $E_1$ reduce by 0.5 (V) as compared to those sampled from the original sawtooth wave $C_1$ (see FIG. 4). The thus reduced voltages are supplied to the inverted input terminals (−) to comparators 30a and 30b.

In FIG. 4, if the sample-hold value V2 of the sawtooth wave $C_1$ at the timing of a falling edge of the synchronizing signal $E_1$ takes the maximum value, the sample hold signal $F_1$ is to be approximately 5 (V). Suppose that the sample-hold value fluctuates in a little degree due to a noise or offset upon the comparison in the comparators 30a, 30b, for example, the sample-hold value changes to 5.1 (V). In such a case, the next rising slope of the sawtooth wave signal C1 could not reach the sample-hold voltage, resulting in default of inversion of the comparator outputs $G_1$ and $H_1$.

In co contrast to this, since the sample-hold value is actively reduced by 0.5 (V) by means of the differential amplifying circuit 63a as in this embodiment, the input voltage V2 to the inverted input terminals (−) of the comparators 30a and 30b is set to be 4.6 (V); therefore, the next rising slope of the sawtooth wave signal $C_1$ will necessarily exceed the sample-hold value, i.e., 4.6 (V). As a result, if there are noises and offset, it is possible to prevent the occurrence of malfunctions stated above and to invert the comparator outputs $G_1$ and $H_1$ as designed.

Figure 15:
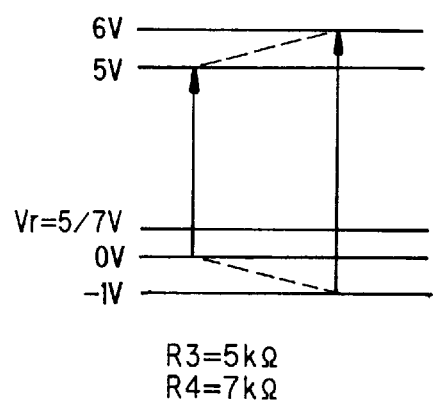
FIG. 15 is an illustrative view showing a change of range of voltage values in a sixth embodiment.

On the other hand, the differential amplifying circuit 63b is set up so that the resistance value of a resistor R3 is smaller than that of a resistor R4 in contrast to the differential amplifying circuit 63a. Since Vo is given as Vo=(R4/R3)×(Vi−Vr) and R3<R4, the variation width of the signal will be increased. Two differential amplifying circuits 63b are used so that the input Vi and output Vo of each differential amplifying circuit 63b is connected between the terminals 66b as well as between the terminals 66c. The terminals 66a are short-circuited. As shown in FIG. 15, suppose that with the reference voltage Vr=5/7 (V), R3=5 (kΩ) and R4=7 (kΩ), the input voltage Vi varies within a range from 0 (V) to 5 (V), the output voltage Vo will vary from −1 (V) to 6 (V). That is, the variation range will be broadened. As a result, the sample-hold values at the timing of the falling edges of the synchronizing signal $E_1$ increase upward and downward by 1 (V) as compared to those sampled from the original sawtooth wave $C_1$ (see FIG. 4). The thus increased voltages are supplied to the non-inverted input terminals (+) to comparators 30a and 30b.

In FIG. 4, if the sample-hold value V2 of the sawtooth wave $C_1$ at the timing of a falling edge of the synchronizing signal $E_1$ takes the maximum value which is raised to, for example, 5.9 (V) due to a noise or offset. Since the voltages of the sawtooth wave signals $C_1$ and $D_1$ are increased by 1 (V) by respective differential amplifying circuits 63b, the maximum of the sawtooth waves may exceed the sample-hold value 5.9 (V). As a result, if there are noises and offset, it is possible to invert the comparator outputs $G_1$ and $H_1$ as designed.

In the above two cases, although the pixel clock $K_1$ produced will deviate from the ideal timing due to the variation of the voltages, it is possible to minimize the departure by properly adjusting the resistance values of R1 and R2 or R3 and R4, to an innocuous level.

(SEVENTH EMBODIMENT)

Figure 16:
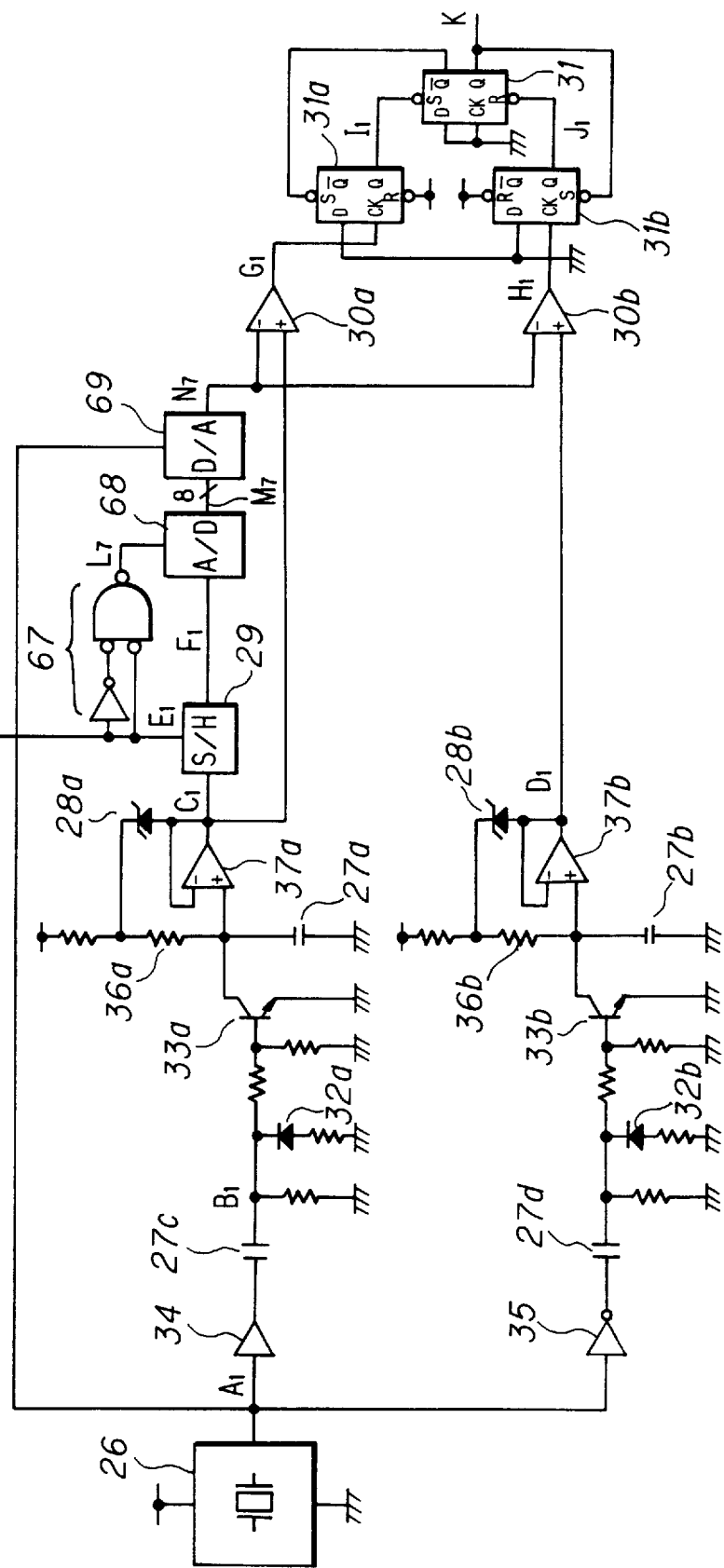
FIG. 16 is a circuit diagram showing a laser unit controlling circuit in accordance with a seventh embodiment.

FIG. 16 is a circuit diagram showing a laser unit controlling circuit in accordance with a seventh embodiment. This embodiment corresponds to a circuit configuration of the first embodiment (FIG. 3) in which a differentiating circuit, an A/D converter and a D/A converter are connected.

The same components as in FIG. 3 are allotted with the same reference numerals.

Figure 17:
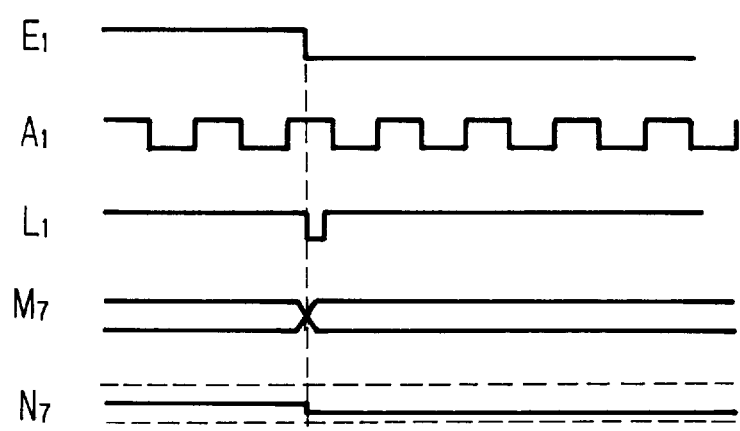
FIG. 17 is a timing chart for illustrating the operation of a seventh embodiment.

A differentiating circuit 67 is composed of an inverter and an OR gate. A voltage value which is sampled as a sample-hold signal $F_1$ by a sample-hold IC 29 when a synchronizing signal $E_1$ falls, is inputted to an A/D converter 68. As shown in a timing chart of FIG. 17, as soon as the synchronizing signal E1 falls, a pulse $L_7$ is supplied from the differentiating circuit 67 to the A/D converter 68 which effects A/D conversion of the voltage value of the sample-hold signal $F_1$ into an 8-bit digital data $M_7$. A D/A converter 69 converts the digital data $M_7$ into an analog signal $N_7$ and supplies the result to the inverted input terminals (−) to comparators 30a and 30b.

A typical sample-hold circuit utilizes a capacitor which has been applied with a signal voltage and cuts off the input as soon as a sampling signal is inputted so that the voltage at the time of sampling will be retained. Accordingly, in order to increase the clocking rate of a clock signal $K_1$, or therefore accelerate the analog periodic signals (sawtooth waves) $C_1$, $D_1$, it is necessary to shorten the charging/discharging time of the capacitor. To achieve this, the capacitance of the capacitor should be lowered. As the capacitance of a capacitor lowers, however, the voltage across the capacitor is liable to be affected by a slight noise or current leak from the capacitor becomes a critical problem so that the voltage gradually will lower during each scan of one line.

In this embodiment, since the sample-hold value is retained as a digital value, it is possible to avoid the above problems. That is, the sample hold value is hardly affected by the influence of the current leak or voltage variations, so that it is possible to produce a pixel clock $K_1$ which is stable across the scan of one line, still increase the rate of the pixel clock signal $K_1$.

Although in the sixth embodiment, a sample-hold voltage is retained by the analog process, the sample-hold voltage will be retained as a digital value in this embodiment. Accordingly, when the voltage range is to be narrowed as shown in FIG. 14, the differential amplifying circuit 63a (or 63b) can be realized by an equivalent circuit composed of digitally operating elements. Usually, it is vary difficult to integrate a circuit into an LSI if it is an analog circuit but it is easy to integrate a digital circuit into an LSI. Accordingly, if a digital circuit equivalent to the differential amplifying circuit 63a (or 63b) is integrally incorporated into the LSI with the other digital circuits, the cost for the extra circuit is soaked up by the cost of the LSI with little cost increased.

In this embodiment, although the A/D converter 68 is disposed after the sample-hold IC 29, it is also possible to use an A/D converter with a built-in sample-hold circuit or a so-called flash A/D converter which does not require any sample-hold circuit. In these cases, it is possible to construct the sample-hold structure with A/D and D/A converters alone without providing the sample-hold IC 29.

In accordance with the image forming apparatus of the invention, a clock signal which has the same cyclic period with one-pixel period of the pixel clock can be used as the clock based on which the oscillating means generates analog periodic signals. Since no clock of a higher frequency is not required which would be used in the conventional configuration, it is possible to configure a simplified circuit at a reduced cost. Further, there is no more necessary to prepare a large number of clocks which have different delay times of a minute step from one another as would be required in the conventional example. Accordingly, it is possible to produce a pixel clock signal which regularly keeps a constant time relation with high precision relative to the timing of the synchronizing signal.

In accordance with the image forming apparatus of the invention, since two analog periodic signals having a phase difference of 180° are used, it is possible to avoid the inconvenience that sample-hold is performed during the phase in which the analog periodic signal sharply varies. That is, the sample-holding of a voltage value is performed from the portion in which the signal varies slowly. Accordingly, it is possible to gain stabilized sample-hold values, and consequently improve the clock timing of the pixel clock.

In accordance with the image forming apparatus of the invention, since a chopping wave which will not vary sharply is used as the analog periodic signal, it is possible to reduce errors of sample-hold values and consequently to produce a stabilized pixel clock.

What is claimed is:
1. An image forming apparatus comprising:
   a synchronizing signal generating means for generating a synchronizing signal which instructs the time when image forming for each line in the main scan direction is to be started;

an oscillating means for generating a first and a second analog periodic signal each having a voltage value and a frequency, wherein said voltage values periodically vary and have the same cyclic period, and a phase difference from one another, and wherein said first and second analog periodic signals are in the form of trapezoidal waves;

sample-hold means for sampling and holding the voltage value of one of said analog periodic signals from said oscillating means in response to the input of the synchronizing signal;

means for providing a selected comparative analog periodic signal;

comparing means for comparing the voltage value which has been sampled and held in said sample-hold means with the comparative analog periodic signal; and a pixel clock generating means for generating a pixel clock signal as to be a reference signal for image forming, in accordance with the output from said comparing means.

2. The image forming apparatus of claim 1, wherein the first and second analog periodic signals are two trapezoidal waves having rising slopes and are generated with the edges of their rising slopes overlapping each other; and the means for providing a selected analog periodic signal provides one of the first and second analog periodic signals.

3. The image forming apparatus of claim 1, further comprising differential amplification means for providing an output by suppressing the frequency of said selected one of the first and second analog periodic signals from the oscillating means to be lower than that of the sample-hold voltage and;

wherein the means for providing a selected analog periodic signal provides a signal corresponding to the output of the differential amplification means.

4. The image forming apparatus of claim 1, wherein the sample-hold means comprises:

an A/D converter; and a D/A converter; and wherein the sample-hold means further holds an A/D converted voltage for at least the formation of one line of image in a main scanning direction, and for D/A converting held voltage.

* * * * *